US006894419B2

United States Patent
Fujita et al.

(10) Patent No.: US 6,894,419 B2
(45) Date of Patent: May 17, 2005

(54) CURRENT PASSING CIRCUIT BOARD FOR ROTARY ELECTRIC MACHINE INSERTED IN MOLDED RESIN

(75) Inventors: Youichi Fujita, Tokyo (JP); Sotsuo Miyoshi, Tokyo (JP); Satoru Hasegawa, Tokyo (JP); Katsunori Takai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 80 days.

(21) Appl. No.: 10/258,798

(22) PCT Filed: Feb. 28, 2001

(86) PCT No.: PCT/JP01/01526

§ 371 (c)(1),
(2), (4) Date: Oct. 28, 2002

(87) PCT Pub. No.: WO02/069477

PCT Pub. Date: Sep. 6, 2002

(65) Prior Publication Data

US 2003/0076001 A1 Apr. 24, 2003

(51) Int. Cl.⁷ .................. H02K 13/00; H02K 13/04; H01K 39/06; H01R 39/06
(52) U.S. Cl. .................. 310/235; 310/71; 310/219; 310/231; 310/233; 257/724; 257/786; 317/234 R
(58) Field of Search .................. 310/71, 40 R, 310/219, 231, 233, 235; 257/724, 786, 909; 317/234 A, 234 R

(56) References Cited

U.S. PATENT DOCUMENTS

| | | | | |
|---|---|---|---|---|
| 3,573,516 A | * | 4/1971 | Lyon et al. | 310/68 D |
| 3,602,793 A | * | 8/1971 | Grozinger | 310/68 D |
| 3,604,963 A | * | 9/1971 | Tawara | 310/68 D |
| 3,641,374 A | * | 2/1972 | Sato | 310/68 D |
| 3,777,193 A | * | 12/1973 | Buehner | 310/68 D |
| 3,789,275 A | * | 1/1974 | Sawano et al. | 257/724 |
| 4,232,238 A | * | 11/1980 | Saito et al. | 310/68 D |
| 4,604,643 A | * | 8/1986 | Yotsumoto et al. | 257/732 |
| 4,926,078 A | * | 5/1990 | Isozumi et al. | 310/71 |
| 4,952,829 A | | 8/1990 | Armbruster et al. | 310/68 D |
| 5,013,948 A | * | 5/1991 | Tumpey et al. | 310/68 D |
| 5,530,311 A | * | 6/1996 | Ziegler | 310/237 |
| 5,677,588 A | * | 10/1997 | Strobl | 310/237 |
| 5,682,070 A | * | 10/1997 | Adachi et al. | 310/71 |
| 5,712,517 A | * | 1/1998 | Schmidt et al. | 310/45 |
| 5,760,518 A | * | 6/1998 | Abe et al. | 310/237 |
| 5,793,140 A | * | 8/1998 | Tuckey | 310/237 |
| 5,962,946 A | * | 10/1999 | Kobman et al. | 310/233 |
| 5,996,210 A | * | 12/1999 | Konig | 29/597 |
| 6,222,298 B1 | * | 4/2001 | Saito et al. | 310/233 |
| 6,490,780 B1 | * | 12/2002 | Kim et al. | 29/597 |
| 6,515,398 B1 | * | 2/2003 | Fudono et al. | 310/239 |
| 6,584,673 B2 | * | 7/2003 | Schmidt | 29/597 |
| 6,661,134 B2 | * | 12/2003 | Sunaga et al. | 310/64 |
| 6,664,676 B1 | * | 12/2003 | Yoshida et al. | 310/71 |
| 6,674,212 B2 | * | 1/2004 | Inukai et al. | 310/223 |
| 6,684,485 B1 | * | 2/2004 | Potocnik et al. | 29/597 |
| 6,737,772 B2 | * | 5/2004 | Tanaka et al. | 310/71 |
| 6,836,050 B2 | * | 12/2004 | Akabane et al. | 310/239 |

FOREIGN PATENT DOCUMENTS

| | | | | |
|---|---|---|---|---|
| DE | 197 05 833 A | | 8/1998 | H02K/5/14 |
| EP | 501787 A2 | * | 9/1992 | H01R/39/04 |
| JP | 4-140054 | | 5/1992 | H02K/29/08 |
| JP | 9-322459 | | 12/1997 | H02K/3/50 |
| JP | 10-174340 | | 6/1998 | H02K/3/50 |

* cited by examiner

Primary Examiner—Darren Schuberg
Assistant Examiner—Pedro J. Cuevas
(74) Attorney, Agent, or Firm—Sughrue Mion, PLLC

(57) ABSTRACT

One current passing circuit board is constituted by one metal plate in which a continuous current passing pattern that is to be separated in a plurality of current passing patterns is formed, and molded resin in which the metal plate is inserted. The current passing circuit board is pressed to eliminate the unnecessary portions of the above mentioned current patterns, thereby the one current passing circuit board is formed in a state where the current passing pattern continuously formed is separated in the normal forms.

3 Claims, 8 Drawing Sheets

(a)

(b)

(c)

(a)

(b)

(c)

(a)

(b)

(c)

(a)

(b)

(c)

CURRENT PASSING CIRCUIT BOARD FOR ROTARY ELECTRIC MACHINE INSERTED IN MOLDED RESIN

TECHNICAL FIELD

The present invention relates to a current passing circuit board of a rotary electric machine for electrically connecting the winding terminals of stator coils of, for example, a DC motor, a generator or the like.

BACKGROUND ART

While a conventional rotary electric machine such as a DC motor used crossover wirings as connection means for electrically connecting the winding terminals of the respective stator coils thereof, a printed circuit board or a single pressed metal plate in place of the crossover wirings has been used so as to facilitate the connection work of winding terminals and to prevent a break in the connection portions of the winding terminals when the stator is molded.

FIGS. 1(a) to (c) are developed perspective views to show the coil winding portions of stator coils in conventional DC motors in which winding patterns are different.

In the drawings, a reference numeral 1 denotes an annular yoke; a reference numeral 2 denotes a plurality of teeth disposed on the inner peripheral surface of the yoke 1; a reference numeral 3 denotes a terminal, and a reference numeral 4 denotes windings wound around the above mentioned respective teeth 2 to constitute a plurality of stator coils. The terminal portions of these windings 4 are connected to the respective stator coils by crossover wirings (not shown) to constitute the stators and the stators are molded with resin. Here, in FIGS. 1(a), (b), the windings 4 wound around the teeth 2 constitute three-phase stator coils of U-phase, V-phase, and W-phase, and in FIG. 1(c), the terminal 3 is constituted by two terminals 3a, 3b for one tooth 2. Here, in FIG. 1(a), a reference numeral 5 denotes a common wire-wound portion.

Because the winding termination portion of the conventional rotary electric machine is constituted in the manner described above, there is presented a problem that many malfunctions of breaks in the above mentioned crossover wirings are caused by a molding pressure when a stator is molded in a state where the terminals of the windings 4 wound around the respective teeth 2 are connected to the respective stator coils by crossover wirings. Further, connecting the terminals of many windings 4 wound around the respective teeth 2 respectively by the crossover wirings to stator coils, as described above, presents a problem of making the connection work troublesome and thus reducing workability. Still further, there is presented a problem that forming common wirings by an automated machine makes winding processes increased for additional terminals and common wire-wound.

For this reason, in the conventional rotary electric machine, a printed circuit board or a single conducting pressed metal plate has been used as a current passing unit to simplify a winding termination process.

In a case of the printed circuit board, however, there is presented a problem that while a device can be mounted thereon, a spring (plate spring) of a motor brush for contact can not be welded thereto thereby it causes not only reducing flexibility but also increasing manufacturing cost. Further, there is presented another problem that in order to mount a noise removing device such as a capacitor, a resistor or the like, a mounting board thereof heeds to be mounted thereon as a separate component.

On the other hand, in a case of the single pressed metal plate, there are presented the following problems: constituting a complex current passing pattern requires a plurality of metal plates, which results in increasing a number of components and making the work of mounting them troublesome and increasing manufacturing cost; and, in general, a pressed metal plate used as this kind of current passing means is a thin plate, so that in a case where a single plate is used, in particular, its strength is not sufficient.

The present invention has been made to solve the above mentioned problems. It is the object of the present invention to provide a current passing circuit board of a rotary electric machine in which a plurality of wiring patterns that are complex and are to be electrically isolated from each other can be formed of a one metal plate and at the same time it eliminates the need for using a crossover wiring to thereby make a winding termination process easy, and it is easy to manufacture and can reduce the number of components and can reduce the manufacturing cost.

Further, it is also the object of the present invention to provide a current passing circuit board of a rotary electric machine on which a noise removing device and brush for contact can be mounted.

Still further, it is the object of the present invention to provide a current passing circuit board of a rotary electric machine which can be applied also to a brushless rotary electric machine.

Still further, it is the object of the present invention to provide a current passing circuit board of a rotary electric machine which can be mounted easily to fix on the side of a stator.

Still further, it is the object of the present invention to provide a current passing circuit board of a rotary electric machine in which an independent winding can be wound around each of the tooth of a stator core.

DISCLOSURE OF THE INVENTION

A current passing circuit board of a rotary electric machine in accordance with the present invention includes a metal plate in which a plurality of current passing patterns are continuously formed and a molded resin in which the metal plate is inserted, it is characterized by that the integrally formed combination of the metal plate and the molded resin is pressed to punch out and eliminate the unnecessary portions of the current passing pattern to thereby form normal current passing patterns.

According to this constitution, current passing patterns which are fundamentally to be electrically separated from each other are formed as one continuous current passing pattern that includes the unnecessary portions of the patterns, and the one continuous current passing pattern is molded with resin and the molded current passing pattern is pressed to punch out and eliminate the unnecessary portions of the above mentioned current passing pattern, thereby one current passing part can be produced in which the above mentioned one current passing pattern is separated into a plurality of current passing patterns. Therefore, it is not necessary to overlap or arrange a plurality of metal plates, for example, in a case of a complex current pattern, like a single pressed metal plate in the prior art, but it is possible to make one current passing part perform the function as current passing patterns separated into a plurality of current passing patterns and to produce an effect of reducing the number of components and reducing manufacturing cost.

In the current passing circuit board of a rotary electric machine in accordance with the present invention, the current passing pattern of the rotary electric machine having brush for contact is formed by pressing the metal plate.

According to this constitution, it is possible to produce an effect of applying the current passing circuit board as a driving part of a rotary electric machine such as a DC motor having brush for contact.

In the current passing circuit board of a rotary electric machine in accordance with the present invention, the metal plate is provided with a portion where a device for removing noises is mounted.

According to this constitution, it is possible to produce an effect of mounting the device for removing noises without using another board.

In the current passing circuit board of a rotary electric machine in accordance with the present invention, the metal plate is provided with a portion where brush for contact is bonded.

According to this constitution, it is possible to produce an effect of easily mounting the brush for contact and eliminating the need for providing another member for mounting the brush.

In the current passing circuit board of a rotary electric machine in accordance with the present invention, only the portion of the current passing pattern of the metal plate is provided with a crossover wiring by a winding.

According to this constitution, it is possible to produce an effect of easily mounting the brush for contact and the device by means of one current passing circuit board.

In the current passing circuit board of a rotary electric machine in accordance with the present invention, the metal plate is provided with the current passing pattern for driving a brushless rotary electric machine.

According to this constitution, it is possible to produce an effect of applying the current passing circuit board also as the driving part of a brushless machine.

In the current passing circuit board of a rotary electric machine in accordance with the present invention, the metal plate is bonded to a terminal to which the coil of the rotary electric machine is connected.

According to this constitution, it is possible to produce an effect of ensuring stable conductivity as a current passing part for driving a rotary electric machine.

The current passing circuit board of a rotary electric machine in accordance with the present invention is pressed onto and fixed to a stator side by a sensor case mounted on the stator side of the rotary electric machine.

According to this constitution, it is possible to produce an effect of easily mounting and fixing the current passing part to the side of the stator by the use of the sensor case.

The current passing circuit board of a rotary electric machine in accordance with the present invention is fixed to the side of the stator by swaging a protrusion formed on the side of the stator by an ultrasonic resin fusing method.

According to this constitution, it is possible to produce an effect of mounting the current passing part to the side of the stator easily and firmly.

The current passing circuit board of a rotary electric machine in accordance with the present invention has a positioning portion by which it is mounted at the predetermined position of the stator.

According to this constitution, it is possible to produce an effect of easily mounting the current passing part at the predetermined position of the stator.

The current passing circuit board of a rotary electric machine in accordance with the present invention is mounted and fixed to a stator side of the rotary electric machine such that its inclination can be adjustable.

According to this constitution, it is possible to produce an effect of mounting the current passing circuit board while finely adjusting the position of the brush for contact and the position of the sensor wherein the brush and the sensor are on the current passing part.

In the current passing circuit board of a rotary electric machine in accordance with the present invention, a wire is independently wound around each tooth of the stator core.

According to this constitution, it is possible to produce an effect of easily winding a wire and thus improving winding workability and at the same time using the current passing part for both of a brush motor and a brushless motor, for example, without changing the direction of winding the wire for the brush motor and the brushless motor.

BEST MODE FOR CARRYING OUT THE INVENTION

In order to describe the present invention in more detail, the best mode for carrying out the present invention will be hereinafter described with reference to the accompanying drawings.

Preferred Embodiment 1

Figure 1:
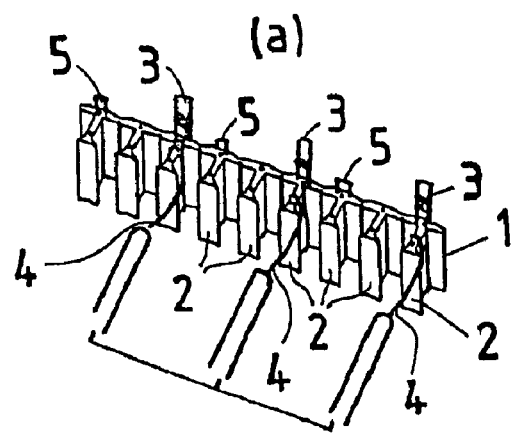
FIGS. 1(a) to (c) are developed perspective views to show the coil winding portions of the stator coils in conventional DC motors in which winding patterns are different.
Figure 1:
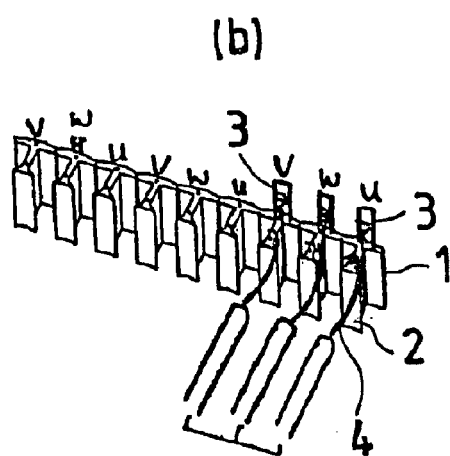
Figure 1:
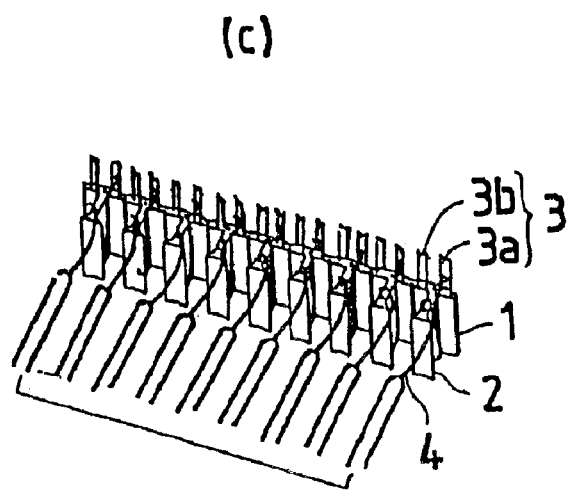
Figure 2:
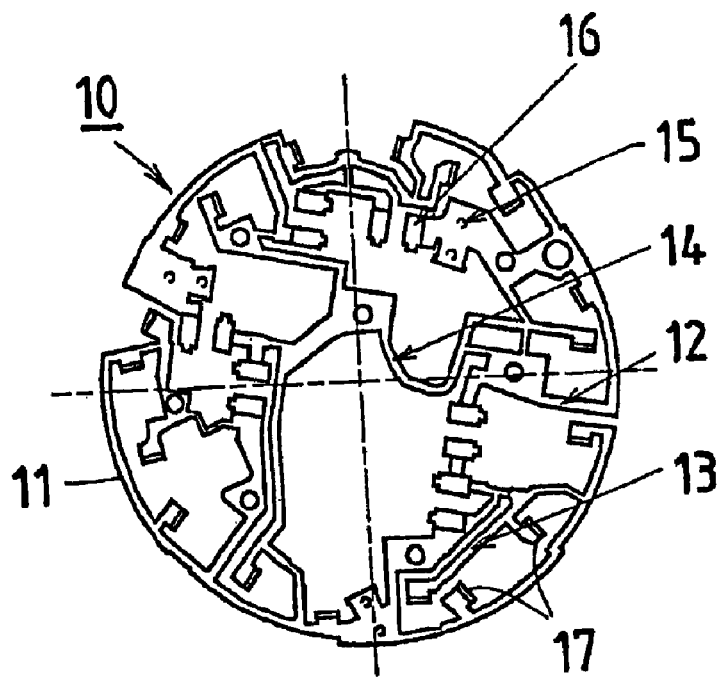
FIG. 2 is a plan view of a metal plate constituting a current passing pattern of a current passing circuit board (current passing part) of a rotary electric machine in accordance with a preferred embodiment 1 of the present invention.

FIG. 2 is a plan view of a metal plate constituting a current passing pattern of a current passing circuit board (current passing part) of a rotary electric machine in accordance with a preferred embodiment 1 of the present invention.

In FIG. 2, a reference numeral 10 denotes a metal plate made of a conducting material such as brass. The metal plate 10 is formed in the shape of a predetermined pattern by pressing and, to be more specific, in the metal plate 10, a nearly annular frame portion (formed frame) 11, and a current passing pattern 12 and a crossover portion 13, both of which are connected to the frame portion 11, and a common wiring portion 14, a brush setting portion 15 and a device mounting portion 16 are connected continuously to each other on a same plane. Further, a predetermined number of terminal portions 17 are bent at the predetermined portions of the frame portion 11, the current passing pattern 12 and the crossover wiring portion 13 by the above mentioned pressing.

Figure 3:
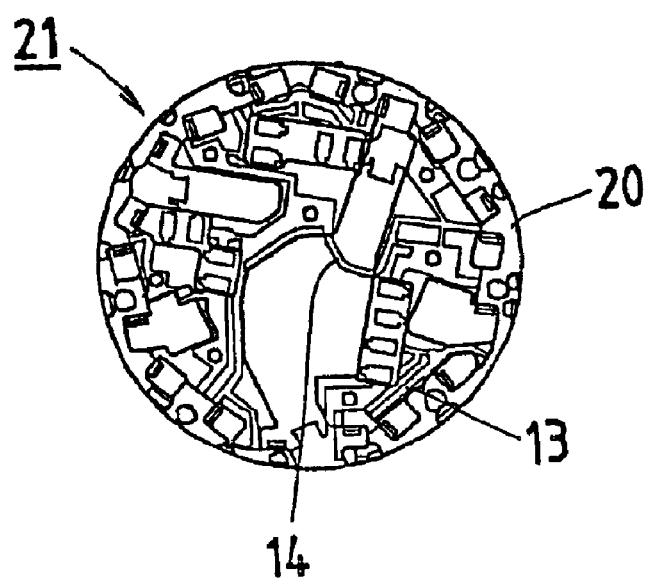
FIG. 3 is a plan view to show a current passing circuit board constituted by molding the metal plate of resin which is shown in FIG. 2.

FIG. 3 is a plan view of a current passing circuit board constituted by molding the metal plate of resin which is shown in FIG. 2. In FIG. 3, a reference numeral 20 denotes a molded resin into which the above described metal plate 10 is inserted and a reference numeral 21 denotes a current passing circuit board (current passing part) constituted by the molded resin 20 and the above mentioned metal plate 10.

That is to say, the integrally-structured current passing circuit board 21 of the molded resin 20 and the above mentioned metal plate 10 are constituted by molding the metal plate 10, which is pressed in the shape of the pattern shown in FIG. 2, of resin 20.

Figure 4:
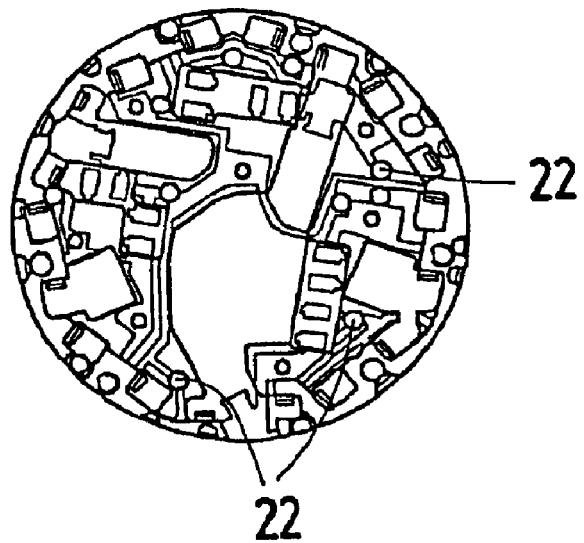
FIG. 4 is a plan view of the current passing circuit board in FIG. 3 in a finished state.

FIG. 4 is a plan view of the current passing circuit board in FIG. 3 in a finished state.

In FIG. 4, a reference numeral 22 denotes a separating portion of the current passing pattern 12 formed of the metal plate 10, and the separating portion 22 is to be a pattern cutting portion where the unnecessary portion of the above mentioned current passing pattern 12 is cut off and eliminated by pressing the current passing circuit board 21 as the finishing process of the current passing circuit board 21. Further, the frame portion 11 of the metal plate 10 shown in FIG. 2 is also to be cut off and eliminated by the finish pressing of the above mentioned current passing circuit board 21. Therefore, the unnecessary portions of the current passing patterns 12 shown in FIG. 2 are cut off and eliminated by the finish pressing of the current passing bond 21 to constitute an essential isolated pattern in which the respective current passing patterns 12 are electrically isolated from each other and the respective crossover wiring portions 13 are also independent of each other. However, the plurality of isolated current passing patterns 12 and the plurality of isolated crossover wiring portions 13 are integrally bonded to each other in advance by the molded resin 20, so that they don't come apart.

Figure 5:
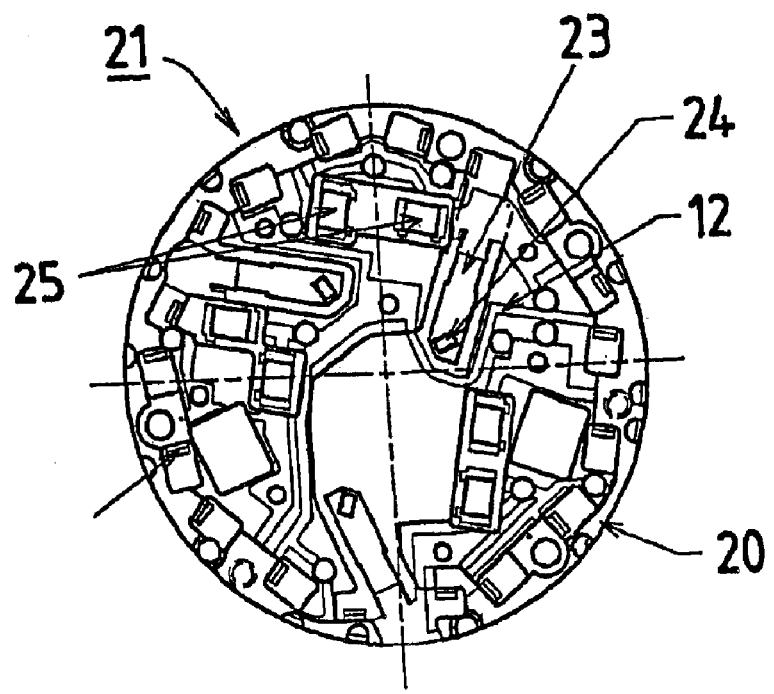
FIG. 5 is a plan view of a state where the current passing circuit board in FIG. 4 is mounted with components.

FIG. 5 is a plan view of a state where the current passing circuit board in FIG. 4 is mounted with components.

In FIG. 5, a reference numeral 23 denotes a plate spring for urging brush and a base end of the plate spring 23 is bonded to the brush setting portion 15 of the metal plate 10 (current passing pattern 12) by a spot welding or the like, and brush 24 for contact is bonded to the tip of the plate spring 23. A reference numeral 25 denotes a device for removing noises (such as a capacitor, a resistance or the like) that is mounted on the device mounting portion 16 of the metal plate 10.

That is, the current passing circuit board 21 as one current passing part that has the plurality of isolated current passing patterns 12, the plurality of isolated crossover wiring portions 13 and the common wiring 14, is constituted by mounting respectively on the predetermined points of the metal plate 10 of the current passing circuit board 21 that is finished, as shown in FIG. 4, the plurality of devices 25 and the plate spring 23 to which the brush 24 is bonded.

Figure 6:
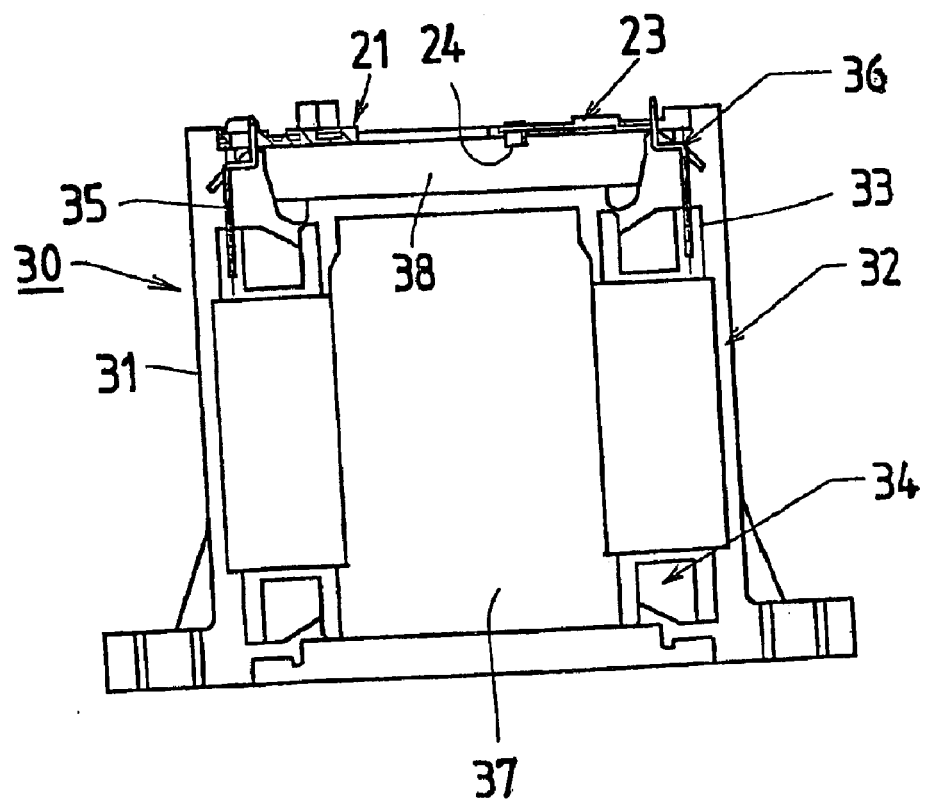
FIG. 6 is a schematic cross sectional view of a DC motor.

FIG. 6 is a schematic cross sectional view of the DC motor.

In FIG. 6, a reference numeral 30 denotes a DC motor that is one of a rotary electric machine; a reference numeral 31 denotes a motor case; a reference numeral 32 denotes a stator; reference numerals 33, 34 denote stator coils; reference numerals 35, 36 denote two terminals connected to one-pole stator coil 33; a reference numeral 37 denotes a rotor rotating in the stator 32; a reference numeral 38 denotes a commutator rotating integrally with the rotor 37; and mounting and fixing the current passing circuit board (current passing part) 21 having the above mentioned constitution on the opening end portion of the commutator 38 side of the above mentioned motor case 31 produces a motor function in which the respective stator coils are electrically connected to each other by the metal plate 10 of the current passing circuit board 21.

According to the preferred embodiment 1 described above, one current passing part 21 is formed of the metal plate 10 in which the current passing patterns 12 those are essentially to be isolated from each other, are continuously formed, and the molded resin 20 into which the metal plate 10 is inserted, and the integrally formed combination of the metal plate 10 and the molded resin 20 is pressed to cut off and eliminate the unnecessary portions of the above mentioned current passing patterns 12 thereby to form the one current passing part 21 that has the plurality of isolated current passing patterns 12 each having a normal shape on the same plane. Accordingly, for example, even in a case where the above mentioned current passing part 21 is applied to a rotary electric machine that is complex and requires a plurality of separated current passing patterns, it is not necessary to overlap or arrange the plurality of current passing parts like a single pressed metal plate in the prior art, but it is essential only to mount the above mentioned one current passing part 21 on the rotary electric machine, it brings a result in producing an effect of reducing the number of components and hence of reducing manufacturing cost.

Further, because the crossover wiring portion 13 is also formed by the above mentioned metal plate 10, it is possible to produce an effect of eliminating the need for providing a different crossover wiring for terminating the windings of the respective stator coils in the prior art and easily terminating the wiring terminals extended vertically from the respective stator coils only by connecting the wiring terminals to the current passing part.

Still further, the different crossover wiring is not required as described above, so that it is possible to produce an effect of winding the wirings independently around the respective teeth and easily winding the wirings.

Still further, because the above mentioned current passing part 21 applied to a DC brush motor is provided with the brush setting portion 15 and the device mounting portion 16, if a conducting plate spring 23 having a brush 24 for contact at the tip thereof is bonded to the above mentioned brush setting portion 15 and a device 25 for preventing noises is bonded to the device mounting portion 16 to realize a unitization to the one current passing part 21, it is possible to produce an effect of reducing the number of components and at the same time of mounting the components on the motor case 31 with ease.

Further, it is possible to produce an effect of easily manufacturing the above mentioned current passing part 21 only by pressing the one metal plate 10 in a predetermined pattern and then by molding the metal plate 10 of the resin and then by finish-pressing the molded metal plate 10.

Preferred Embodiment 2

FIGS. 7(a) to (c) are explanatory views to show the forming processes of the current passing circuit board of a rotary electric machine (brush motor) in accordance with a preferred embodiment 2 of the present invention. The same reference numbers are attached to portions equal to or corresponding to those in FIG. 2 to FIG. 5.

In FIG. 7(a), the metal plate 10 forms the current passing pattern 12 for driving a three-terminal brush motor, and the current passing pattern 12 has the brush setting portion 15 and the device mounting portion 16, in which a portion of the current passing pattern 12 and the device mounting portion 16 are continuously and integrally with the formed frame 11 formed in the shape of a rectangle in one plane.

In the other words, by pressing the metal plate 10, the current passing pattern 12 is punched out in which the formed frame 11, the brush setting portion 15 and the device mounting portion 16 are continuously formed, as shown in FIG. 7(a).

After the metal plate 10 is pressed, the portions other than the formed frame 11 of the above mentioned metal plate 10 are molded with resin to form the metal plate 10 into the state where the current passing pattern 12 and the device mounting portion 16 are inserted into the molded resin 20, as shown in FIG. 7(b).

In this manner, the metal plate 10 in which the current passing pattern 12 and the device mounting portion 16 are molded with resin is finish-pressed in the next process to thereby form the current passing circuit board (current passing part) 21 in which the formed frame 11 and the unnecessary portions of the current passing pattern 12 are removed, as shown in FIG. 7(c).

According to the preferred embodiment 2 described above, the current passing circuit board 21 to be applied to the three-terminal brush motor can be easily formed, so that it is possible to produce the same effect as produced in the above mentioned preferred embodiment 1.

Preferred Embodiment 3

FIGS. 8(a) to (c) are explanatory views to show the forming processes of the current passing circuit board of a rotary electric machine (brushless motor) in accordance with a preferred embodiment 3 of the present invention. The same reference numerals are attached to portions equal to or corresponding to those in FIG. 2 to FIG. 5.

Figure 7:
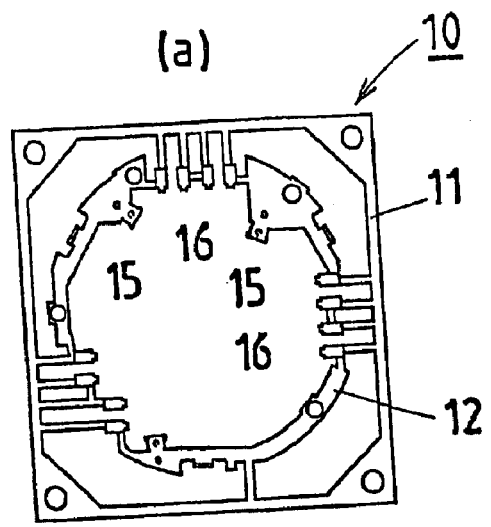
FIGS. 7(a) to (c) are explanatory views to show forming processes of a current passing circuit board of a rotary electric machine (brush motor) in accordance with a preferred embodiment 2 of the present invention.
Figure 7:
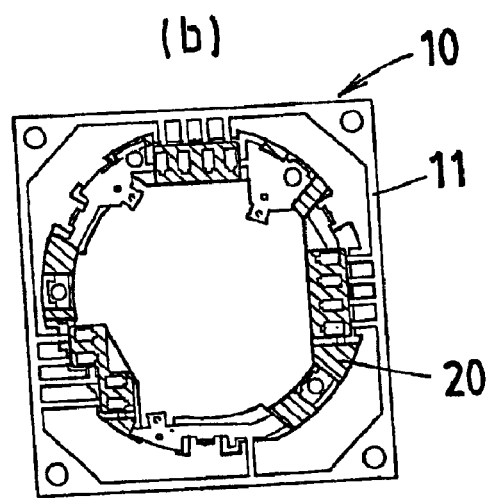
Figure 7:
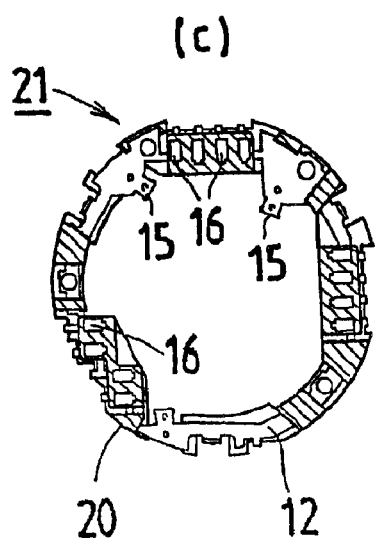

In this preferred embodiment 3, the current passing circuit board 21 to be applied to the brushless motor is formed by the same forming process as shown in FIG. 7. Therefore, it is possible to produce the same effect as produced in the above mentioned preferred embodiment 2.

Preferred Embodiment 4

Figure 9:
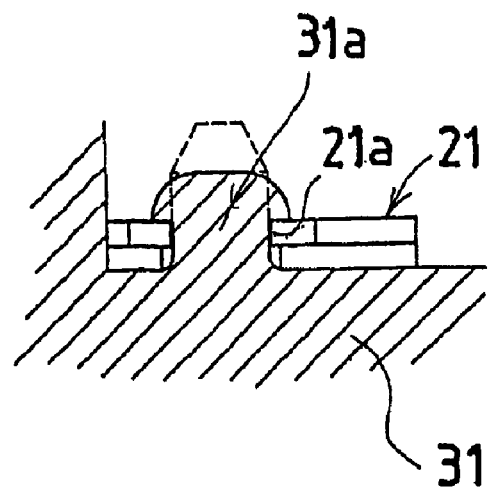
FIG. 9 is a cross sectional view to show a portion where a current passing circuit board of a rotary electric machine is mounted in accordance with a preferred embodiment 4 of the present invention.

FIG. 9 is a cross sectional view to show a portion where the current passing circuit board of the rotary electric motor is mounted in accordance with a preferred embodiment 4 of the present invention.

In FIG. 9, a reference character 31a denotes a protrusion for mounting a current passing circuit board, which is formed integrally in the protruding manner at an opening end portion on the commutator 38 side of the motor case 31 in FIG. 6, and a reference character 21a denotes a mounting hole made in the current passing circuit board 21, and the mounting position of the current passing circuit board 21 is determined by fitting the above mentioned protrusion 31a in the mounting hole 21a. Then, the head portion of the above mentioned protrusion 31a is swaged in this positioned state by an ultrasonic resin fusing method to mount and fix the current passing circuit board 21 to the above mentioned motor case 31.

According to the preferred embodiment 4, it is possible to produce an effect of easily and fixedly mounting the current passing circuit board 21 on the motor case 31.

Preferred Embodiment 5

Figure 10:
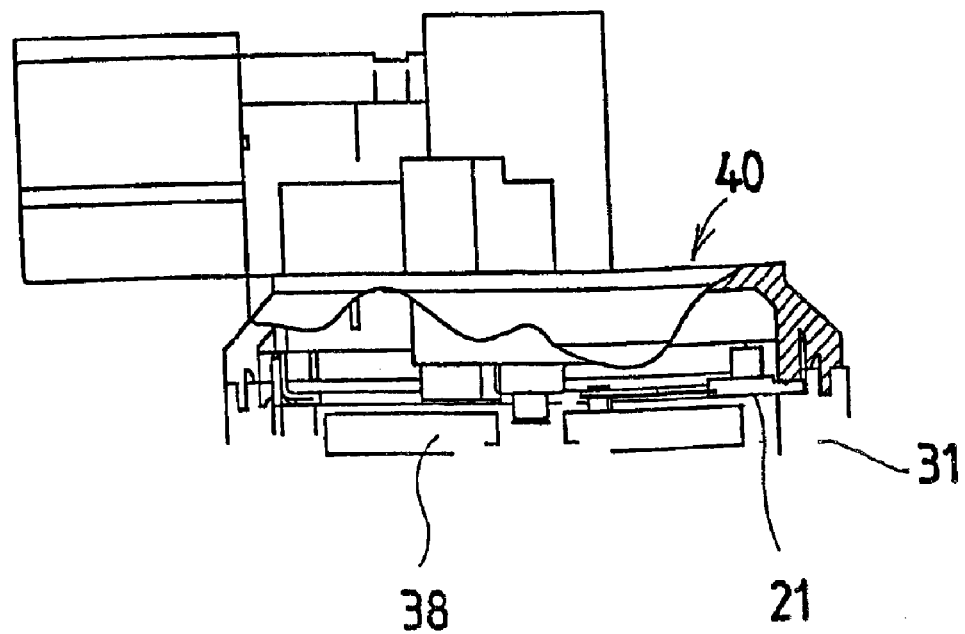
FIG. 10 is a cross sectional view to show a portion where a current passing circuit board of a rotary electric machine is mounted in accordance with a preferred embodiment 5 of the present invention.

FIG. 10 is a cross sectional view to show a portion where a current passing circuit board of the rotary electric motor is mounted in accordance with a preferred embodiment 5 of the present invention.

In FIG. 10, a reference numeral 40 denotes a sensor case that has a built-in sensor and that is mounted on the opening end portion on the commutator 38 side of the motor case 31, and the current passing circuit board 21 is mounted by means of the sensor case 40.

That is to say, in the preferred embodiment 5, when the sensor case 40 is mounted on the motor case 31, the peripheral portion of the current passing circuit board 21 is pressed by the sensor case 40 onto the opening end portion of the motor case 31, thereby being fixed to the motor case 31.

According to such a constitution, it is possible to produce an effect of easily mounting the current passing circuit board 21 on the motor case 31.

Preferred Embodiment 6

Figure 8:
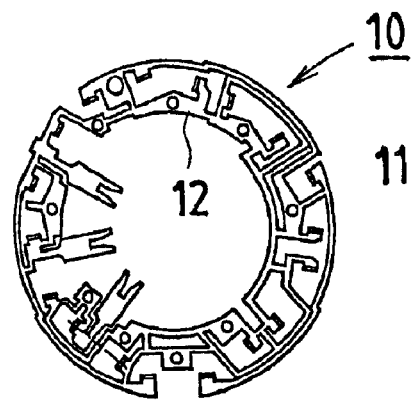
FIGS. 8(a) to (c) are explanatory views to show forming processes of a current passing circuit board of a rotary electric machine (brushless motor) in accordance with a preferred embodiment 3 of the present invention.
Figure 8:
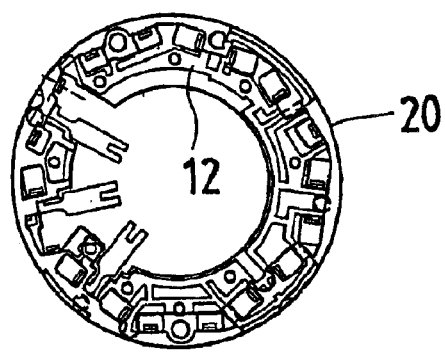
Figure 8:
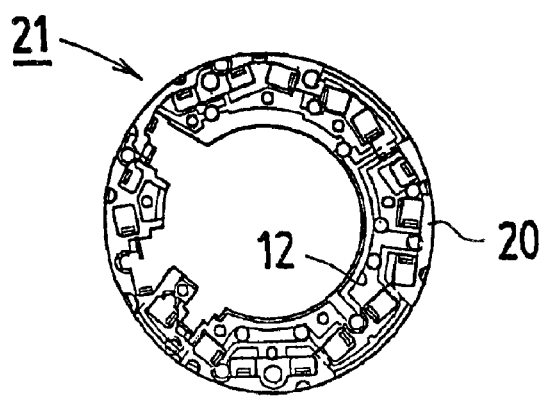
Figure 11:
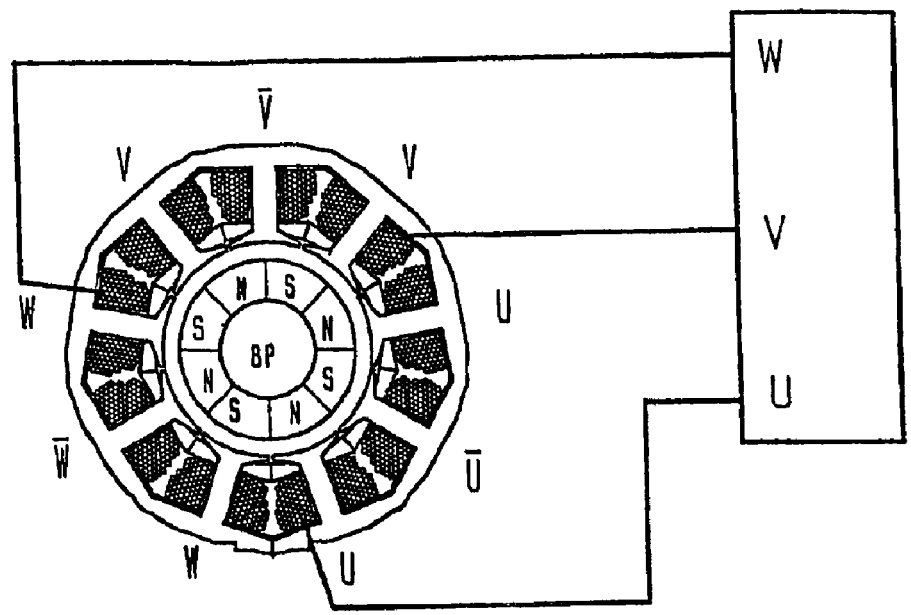
FIG. 11 is a schematic circuit diagram of a brush motor.
Figure 12:
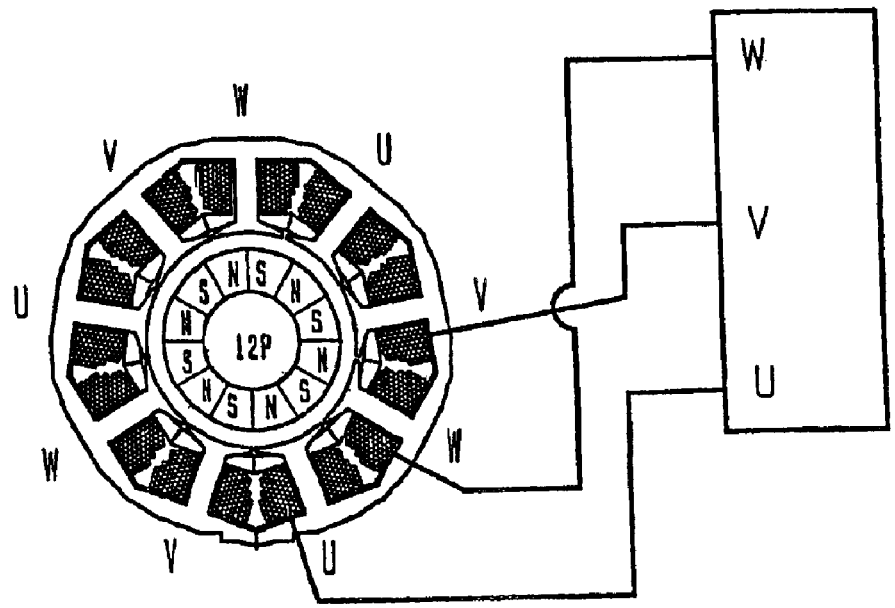
FIG. 12 is a schematic circuit diagram of a brushless motor.

FIG. 11 is a schematic driving circuit diagram of a DC brush motor in FIG. 6, and FIG. 12 is a schematic driving circuit diagram of a brushless motor. In the case of the DC brush motor shown in FIG. 11, the current passing circuit board 21 shown in FIG. 5 or FIG. 7 is applied thereto, and in the case of the brushless motor shown in FIG. 12, the current passing circuit board 21 shown in FIG. 8 is applied thereto.

That is, in the preferred embodiment 6, by forming the current passing circuit board 21 corresponding to the winding direction of the respective stator coils of the DC brush motor and the DC brushless motor, the current passing circuit board 21 can be suitably applied to both of them.

Therefore, according to the preferred embodiment 6, it is possible to produce an effect of applying the current passing circuit board 21 to both of the DC brush motor and the DC brushless motor.

INDUSTRIAL APPLICABILITY

As described above, the current passing circuit board of a rotary electric machine in accordance with the present invention can connect the windings of the respective stator coils of the rotary electric machine such as various kinds of motors, generators and the like without using the crossover wirings and thus can reduce the number of components and can reduce manufacturing cost. In particular, because the current passing circuit board does not need the crossover wirings, the current passing circuit board is suitable to prevent a break in wiring and to improve reliability.

What is claimed is:

1. A current passing circuit board of a rotary electric machine comprising:

a molded resin having a metal plate inside, the metal plate having a plurality of current passing patterns which are continuously formed on a same plane via a separating portion, wherein said separating portion is a space that is formed through the molded resin including the metal plate, and only a portion of the current passing pattern of the metal plate is provided with crossover wiring by winding.

2. The current passing circuit board of a rotary electric machine as claimed in claim 1, wherein the metal plate molded with resin is pressed onto and fixed to a stator side by a sensor case mounted on the stator side of the rotary electric machine.

3. The current passing circuit board of a rotary electric machine as claimed in claim 1, wherein a wire is independently wound around each tooth of the stator core.

* * * * *